US008386611B2

(12) United States Patent
Inoue

(10) Patent No.: US 8,386,611 B2
(45) Date of Patent: *Feb. 26, 2013

(54) INFORMATION SYSTEM, LOAD CONTROL METHOD, LOAD CONTROL PROGRAM AND RECORDING MEDIUM

(75) Inventor: Masashi Inoue, Kyoto-fu (JP)

(73) Assignee: International Business Machines Corporation, Armonk, NY (US)

( * ) Notice: Subject to any disclaimer, the term of this patent is extended or adjusted under 35 U.S.C. 154(b) by 932 days.

This patent is subject to a terminal disclaimer.

(21) Appl. No.: 12/351,277

(22) Filed: Jan. 9, 2009

(65) Prior Publication Data
US 2009/0133031 A1 May 21, 2009

Related U.S. Application Data

(63) Continuation of application No. 10/577,174, filed on Apr. 26, 2006, now Pat. No. 7,480,719.

(30) Foreign Application Priority Data

Oct. 29, 2003 (JP) .................................. 2003-368773
Oct. 27, 2004 (JP) ...................... PCT/JP2004/015902

(51) Int. Cl.
*G06F 15/173* (2006.01)
*G06F 9/46* (2006.01)
*G06F 9/44* (2006.01)

(52) U.S. Cl. .......................... 709/226; 709/223; 718/105

(58) Field of Classification Search ........................ None
See application file for complete search history.

(56) References Cited

U.S. PATENT DOCUMENTS

| 5,235,508 A | 8/1993 | Lirov |
| 5,881,283 A | 3/1999 | Hondou et al. |
| 6,381,617 B1 | 4/2002 | Frolund et al. |

(Continued)

FOREIGN PATENT DOCUMENTS

| JP | 57000757 | 1/1982 |
| JP | 63-184840 | 7/1988 |

(Continued)

OTHER PUBLICATIONS

Mitchell, Mark et al.; Advanced Linux Programming; [Online] Jun. 11, 2001; XP-002474090; ISBN: 978-0-7357-1043-6; Retrieved from the Internet: URL:http://proquest.safaribooksonline.com/0735710430> [retrieved on Mar. 27, 2008]; Section 8.5; 4 pages.

(Continued)

*Primary Examiner* — Ranodhi Serrao
*Assistant Examiner* — Muktesh G Gupta
(74) *Attorney, Agent, or Firm* — Schmeiser, Olsen & Watts; John Pivnichny

(57) ABSTRACT

A load control server, computer program product, and method for controlling bottlenecks in an information system that includes application servers and a database server. Each application server executes at least one application program for processing a transaction received by each application server. The database server accesses a database based on a request received from an application server. A processing time required for each application program to process the transaction is monitored. A bottleneck relating to usage of at least one resource is detected. Each resource is a resource of at least one application server, a resource related to input to the transaction, a resource of the database server, or a resource related to the transaction. The detecting responds to the monitoring determining that the processing time for processing the transaction by at least one application server is not within a predesignated permissible processing time range. The detected bottleneck is removed.

20 Claims, 5 Drawing Sheets

U.S. PATENT DOCUMENTS

| | | | |
|---|---|---|---|
| 6,560,717 B1 * | 5/2003 | Scott et al. | 714/4.1 |
| 6,615,253 B1 | 9/2003 | Bowman-Amuah | |
| 6,859,834 B1 * | 2/2005 | Arora et al. | 709/227 |
| 6,950,848 B1 | 9/2005 | Yousefi'zadeh | |
| 6,965,938 B1 | 11/2005 | Beasley et al. | |
| 7,051,330 B1 | 5/2006 | Kaler et al. | |
| 7,069,267 B2 | 6/2006 | Spencer, Jr. | |
| 7,146,353 B2 * | 12/2006 | Garg et al. | 1/1 |
| 7,263,555 B2 * | 8/2007 | Banerjee et al. | 709/226 |
| 7,281,045 B2 * | 10/2007 | Aggarwal et al. | 709/226 |
| 7,296,268 B2 | 11/2007 | Darling et al. | |
| 7,441,033 B2 * | 10/2008 | Chidambaran et al. | 709/226 |
| 7,480,719 B2 | 1/2009 | Inoue | |
| 7,493,380 B2 | 2/2009 | Aman et al. | |
| 7,707,581 B2 | 4/2010 | Inoue | |
| 7,805,509 B2 * | 9/2010 | Alon et al. | 709/224 |
| 8,086,596 B2 * | 12/2011 | Bernardini et al. | 707/713 |
| 8,095,662 B1 * | 1/2012 | Lappas et al. | 709/226 |
| 2003/0023727 A1 | 1/2003 | Hunt et al. | |
| 2003/0028583 A1 | 2/2003 | Flores et al. | |
| 2004/0078742 A1 | 4/2004 | Emek et al. | |
| 2005/0172303 A1 | 8/2005 | Kudo et al. | |
| 2006/0165000 A1 | 7/2006 | Nakaminami et al. | |
| 2006/0195579 A1 | 8/2006 | Inoue | |
| 2007/0157210 A1 | 7/2007 | Inoue | |
| 2010/0094992 A1 * | 4/2010 | Cherkasova et al. | 709/224 |
| 2011/0145795 A1 * | 6/2011 | Khanapurkar et al. | 717/126 |
| 2012/0060167 A1 * | 3/2012 | Salsburg et al. | 718/104 |

FOREIGN PATENT DOCUMENTS

| | | |
|---|---|---|
| JP | 9-120389 | 5/1997 |
| JP | 11-282695 | 10/1999 |
| JP | 2000-268012 | 9/2000 |
| JP | 2001-160040 | 6/2001 |
| JP | 2003-298655 | 10/2003 |
| WO | WO 01/13228 A2 | 2/2001 |
| WO | WO 01/42908 A2 | 6/2001 |

OTHER PUBLICATIONS

Joines, Stacy et al.; Performance analysis for java Web Sites [Online] Sep. 10, 2002; Addison Weslay Professional, XP-0002474287; Retrieved from the Internet: URL:http://proquest.safaribooksonline. com/0201844540> [retrieved on Mar. 28, 2008 and May 21, 2008]; Chapter 3 Section Databases and Other Back-End Resources; Chapter 13 Section Underutilization; 15 pages.

Czajkowski, Grzegorz et al.; JRES: A Resource Accounting Interface for Java; ACM SIGPLAN Notices, ACM, Association for Computing Machinery, New York, NY, US, vol. 33, No. 10; In Proceedings of the 1998 ACM OOPSLA Conference, Vancouver, BC, Oct. 1998; XP-002469308; ISSN: 0362-1340; pp. 21-35 (15 pages).

Kanodia, Vikram et al.; Multi-Class Latency-Bounded Web Services; 2000 Eighth International Workshop on Quality of Service; In Proceedings of IEEE/IFIP IWQoS 2000 (Cat. No. 00Ex400); IEEE Piscataway, NJ, USA, 2000; XP-002474136; ISBN: 0-7803-6266-7; pp. 231-239 (9 pages).

Notice of Allowance (Mail Date Sep. 12, 2008) for U.S. Appl. No. 10/577,174, filed Apr. 26, 2006; Confirmation No. 1410.

Grabs et al.; High-level Parallelisation in a Database Cluster: a Feasibility Study Using Document Services. Data Engineering, 2001. Proceedings. 17th International Conference on, Apr. 2001; pp. 121-130.

Park et al.; On the Use of Genetic Algorithms in Database Client Clustering, Tools with Artificial Intelligence, 1999. Proceedings. International Conference on, Nov. 1999; pp. 339-342.

Tetsuya Murata; Guide for WEB system churning, Software Design, Gijitsu-Hyohron Co., Ltd. Feb. 18, 2003, No. 148, pp. 112-139.

IBM; An Effective Method of Detecting Abnormally Slow Response Time Situations; IP.com PriorArtDatabase Technical Disclosure; IPCOM000127579D; Sep. 2, 2005; 4 pages.

Office Action (Mail Date Dec. 22, 2008) for U.S. Appl. No. 11/358,462, filed Feb. 21, 2006; Confirmation No. 6013.

Amendment filed Mar. 20, 2009 in response to Office Action (Mail Date Dec. 22, 2008) for U.S. Appl. No. 11/358,462, filed Feb. 21, 2006; Confirmation No. 6013.

Notice of Allowance (Mail Date Apr. 9, 2009) for U.S. Appl. No. 11/358,462, filed Feb. 21, 2006; Confirmation No. 6013.

Office Action (Mail Date Mar. 18, 2008) for U.S. Appl. No. 10/577,174, filed Apr. 26, 2006; Confirmation No. 1410.

Amendment filed Jun. 18, 2008 in response to Office Action (Mail Date Mar. 18, 2008) for U.S. Appl. No. 10/577,174, filed Apr. 26, 2006; Confirmation No. 1410.

* cited by examiner

| TYPE OF LOCATION OF BOTTLENECK | RESOURCE | DETECTION CONDITION | DETERMINATION CONDITION | CANCEL CONDITION |
|---|---|---|---|---|
| RESOURCE USED IN COMMON (DBS) | PROCESSOR | USAGE RATE IS EQUAL TO OR MORE THAN x% PER n SECONDS ON AVERAGE | CONTINUES m TIMES | NOT DETECTED f TIMES |
| | DISK (DB, LOG OR OTHERS) | USAGE RATE IS EQUAL TO OR MORE THAN x% PER n SECONDS ON AVERAGE | CONTINUES m TIMES | NOT DETECTED f TIMES |
| | MEMORY | THE NUMBER OF TIMES FOR PAGING IS EQUAL TO OR MORE THAN x TIMES PER n SECONDS ON AVERAGE | CONTINUES m TIMES | NOT DETECTED f TIMES |
| | DB BUFFER | BUFFER MISS RATE IS EQUAL TO OR MORE THAN x% PER n SECONDS ON AVERAGE | CONTINUES m TIMES | NOT DETECTED f TIMES |
| WAS | PROCESSOR | USAGE RATE IS EQUAL TO OR MORE THAN x% PER n SECONDS ON AVERAGE | CONTINUES m TIMES | NOT DETECTED f TIMES |
| | DISK | USAGE RATE IS EQUAL TO OR MORE THAN x% PER n SECONDS ON AVERAGE | CONTINUES m TIMES | NOT DETECTED f TIMES |
| | MEMORY | PAGING PERFORMANCE COUNT IS EQUAL TO OR MORE THAN x TIMES PER n SECONDS ON AVERAGE | CONTINUES m TIMES | NOT DETECTED f TIMES |
| | JVM MEMORY | GC IS TO BE PERFORMED x TIMES OR MORE PER n SECONDS | CONTINUES m TIMES | NOT DETECTED f TIMES |
| | DB CONNECTION | MULTIPLICITY REACHES THE UPPER LIMIT | OCCURRENCE TIME | WHEN WAS IS HALTED |
| RESOURCE RELATED TO TRANSACTION | WAS PROCESSOR | DBS PROCESS TIME/PROCESS TIME IS EQUAL TO OR LOWER THAN x%. | OCCURRENCE TIME | NO OCCURRENCE FOR n SECONDS |
| | DBS PROCESSOR | DBS PROCESS TIME/PROCESS TIME IS EQUAL TO OR LOWER THAN x%. WITHIN n SECONDS, IT IS TO BE DETERMINED THAT DBS PROCESSOR IS A BOTTLENECK | OCCURRENCE TIME | NO OCCURRENCE FOR n SECONDS |
| | DBS DISK | DBS PROCESS TIME/PROCESS TIME IS EQUAL TO OR LOWER THAN x%. WITHIN n SECONDS, IT IS TO BE DETERMINED DBS DISK IS A BOTTLENECK | OCCURRENCE TIME | NO OCCURRENCE FOR n SECONDS |

Fig. 3

| BOTTLENECK | RESOURCE | LOAD CONTROL INFORMATION |
|---|---|---|
| RESOURCE USED IN COMMON (DBS) | PROCESSOR | LOAD CONTROL PROCESS 3 → 1 → 4 → 2 → 5 → 6 |
| | DISK (DB) | LOAD CONTROL PROCESS 2 → 1 → 6 → 5 |
| | DISK (LOG) | LOAD CONTROL PROCESS 1 → 2 → 5 → 6 |
| | DISK (OTHER) | LOAD CONTROL PROCESS 1 → 5 |
| | MEMORY | LOAD CONTROL PROCESS 1 → 5 |
| | DB BUFFER | LOAD CONTROL PROCESS 1 → 5 |
| WAS | PROCESSOR | LOAD CONTROL PROCESS 3 → 1 → 5 |
| | DISK | LOAD CONTROL PROCESS 1 → 5 |
| | MEMORY | LOAD CONTROL PROCESS 1 → 5 |
| | JVM MEMORY | LOAD CONTROL PROCESS 1 → 5 |
| | DB CONNECTION | LOAD CONTROL PROCESS 1 → 5 |
| RESOURCE RELATED TO TRANSACTION | WAS PROCESSOR | LOAD CONTROL PROCESS 5 |
| | DBS PROCESSOR | LOAD CONTROL PROCESS 5 → 6 |
| | DBS DISK | LOAD CONTROL PROCESS 5 → 6 |

Fig. 4

INFORMATION SYSTEM, LOAD CONTROL METHOD, LOAD CONTROL PROGRAM AND RECORDING MEDIUM

This application is a continuation application claiming priority to Ser. No. 10/577,174, filed Apr. 26, 2006, U.S. Pat. No. 7,480,319, issued Jan. 20, 2009 which claims priority to PCT application number PCT/JP2004/015902 filed Oct. 27, 2004 and to Japan application number JP200368773 filed Oct. 29, 2003.

TECHNICAL FIELD

The present invention relates to an information system, a load control method, a load control program and a recording medium. Specifically, the present invention relates to an information system that includes a plurality of application servers and a database server for performing load control, and a load control method, a load control program and a recording medium therefor.

BACKGROUND ART

Currently, various fundamental technologies have been provided that enable servers to coordinate the execution of applications with the display of Web pages, and it has now become main stream for an information system to be constructed by using a Web function that provides user interfaces that are appropriate for users.

As one technique for controlling the load imposed on such an information system, there is a technique, disclosed in Japanese Patent Laid-Open Publication No. 2001-160040, whereby a server program is executed by one computer, and when the usage rate for the employment by the server program of the CPU of this computer becomes high, the multiplicities of the server program are increased.

Further, a technique has been disclosed, in Japanese Patent Laid-Open Publication No. 2000-268012, for a client server system that includes a load distributing apparatus and a plurality of server computers connected through a LAN, whereby, when the load imposed on the server computer exceeds a threshold value, the load distributing apparatus halts the acceptance of transactions from terminals.

Patent Document 1: Japanese Patent Laid-Open Publication No. 2001-160040
Patent Document 2: Japanese Patent Laid-Open Publication No. 2000-268012

DISCLOSURE OF THE INVENTION

Problems to be Solved by the Invention

A large-scale information system is constituted by a plurality of application servers and one or multiplexed database servers. When a Web page is accessed by a user, the application server executes a corresponding application for the Web page, and transmits, in return, data for the Web page to the terminal, including the execution results. While the database server accesses a database upon receiving a database access request from the application server. For such an information system, it is important that a response time, relative to a transaction received from a user terminal, should be kept within a permissible range of time, and that a large delay should be prevented in the operation of the user. However, with the above described technique, the loads imposed on the server program and the server computer are maintained at a constant level or lower, and the control process can not be performed based on the response time relative to the transaction. Further, a load control process that is appropriate for both the application servers and the database server can not be performed.

One objective of the present invention, therefore, is to provide an information system, a load control method, a load control program and a recording medium that can resolve the above problems.

Means for Solving the Problems

According to a first aspect of the present invention, provided is an information system that includes a plurality of application servers, each of which can execute at least one application program for processing a transaction from a terminal, and a database server for accessing a database based on a request received from any one of the plurality of application servers, comprising:

a process time monitoring unit, for monitoring processing periods of time required for the application program to process a transaction received by an application server;

a bottleneck identification unit, for identifying, based on monitoring results of processing periods, a bottleneck in at least one of the plurality of application servers if the processing period is not within a predesignated permissible range; and a load controller, for reducing a multiplicity of the application program on an application server identified as having a bottleneck. Also, a load control method, a load control program and a recording medium related to the information system are provided.

It should be noted that the overview of the present invention does not enumerate all the characteristics required for the present invention, and sub-combinations of these characteristics can also constitute the invention.

Advantages of the Invention

According to the invention, for an information system that includes multiple application servers and a database server, the appropriate load control processing can be performed in consonance with the processing time required for the transaction on each application server.

BEST MODE FOR CARRYING OUT THE INVENTION

The present invention will now be described while referring to one mode of the present invention. however, the present invention, according to claims, is not limited to the following mode, and not all combinations of characteristics explained in the mode are required by the resolving means for the present invention.

The configuration of an information system 10 according to this mode is shown in FIG. 1. The information system 10 according to this mode monitors periods of time required by a plurality of application servers 120 to process transactions, and to process loads imposed on the plurality of application servers 120 and a database server 150, and employs the monitoring results to perform appropriate load control to resolve bottlenecks for an application server 120 or for the database server 150. Further, when various types of application programs corresponding to various transactions, are combined and executed, the information system 10 of this mode can appropriately perform load control, so that a factor that contributes to the deterioration of the performance of an application program does not adversely affect the processing performance of another application programs.

The information system 10 is a computer system that is to be connected via a network 110, such as the Internet or an intranet, to a plurality of terminals 100 employed by users that employ the information system 10. The information system 10 comprises a plurality of the application servers (WASs: Web Application Servers) 120, a database server (DBS) 150 and a load control server 160.

Each of the plurality of WASs 120 is a server computer that performs at least one application program that includes a Java (registered trademark) servlet or JSPs (Java Server Pages), for processing a transaction, such as an HTTP request, received from the terminals 100. The WAS 120 also transmits to the terminal 100, in turn, a Web page that includes execution results. During the execution of the application program, the WAS 120 requests that the DBS 150 access a database (DB) 152 based on an instruction issued by the application program.

The DBS 150 is a server computer that accesses the DB 152 based on a request received from any one of the plurality of WASs 120, and that transmits, in return, the access results to the WAS 120 that is the request source. The load control server 160 monitors the periods of time required by the plurality of WASs 120 to process transactions and the processing loads imposed on the plurality of WASs 120 and the DBS 150, and provides load control for the information system based on the monitoring results.

The arrangements of the WAS 120, the DBS 150 and the load control server 160 will now be described. Each of the plurality of WASs 120 includes an HTTP server 125, a WEB application server 130, a process time acquisition unit 140, a process load acquisition unit 142 and a server load controller 144. The HTTP server 125 receives a transaction from the terminal 100, and transmits to the terminal 100, in return, a Web page corresponding to the transaction. In this arrangement, the HTTP server 125 may be operated by a server that is a physically separate unit.

The Web application server 130 executes at least one application program 134 in accordance with a transaction received from the terminal 100. In this mode, the Web application server 130 provided for each of the plurality of WASs 120 performs a application program 134, which are selected from a plurality of types of application program 134 and are consonant with the type of transaction received from the terminal 100. In this case, the priority levels to execute on the WAS 120 are designated for the multiple types of application programs 134. More specifically, the multiple types of application programs 134 are categorized into a plurality of groups in accordance with the priority levels, and are executed at the priority levels designated for the groups to which the individual application programs 134 belong.

The Web application server 130 includes a multiplicity controller 132, a DB access controller 136 and a DB connection pool 138. The multiplicity controller 132 controls multiplicities by which the plurality of application programs 134 should be executed concurrently. In this case, the multiplicity of the application program 134 indicates the maximum number of application programs 134 that are to be executed concurrently, in consonance with a plurality of transactions of the same type that were received at the same time.

The DB access controller 136 processes, together, the access requests for the DB 152 issued by the multiple types of application programs 134. Then, the DB access controller 136 allocates a DB connection 139 for each application program 134, so that the priority levels of the multiple application programs 134 can be identified on the DBS 150 side.

More specifically, the DB access controller 136 is connected to the DBS 150 by employing a user ID that differs for each priority level, so that the priority level of the access request can be identified on the DBS 150 side.

The DB connection pool 138 includes a plurality of DE connections 139. Each of the DB connections 139 serves as a connection juncture for the DBS 150 for issuing a request to access the DB 152.

The multiplicity controller 132 and the DB access controller 136 described above may be obtained in a manner such that a WAS 120 performs a set of class functions, for example, that provides a framework whereby the single WAS 120 combines and efficiently operates the plurality of types of application programs 134.

The process time acquisition unit 140 obtains, from the multiplicity controller 132 and the DB access controller 136, individual transaction process times, and obtains statistics, for example, for the processing time for each application program 134 and for the database processing time. At this time, the processing time during which the application program 134 process the transaction received from the terminal 100 is also called a transaction response time. When the processing time required by one application program 134 is not within a permissible range, the process time acquisition unit 140 notifies the load control server 160 of a service level deterioration event that indicates a service level has been lowered for the pertinent application program 134. In this case, the process time acquisition unit 140 may include information, such as the database processing time, in the service level deterioration event to use to notify the load control server 160.

The process load acquisition unit 142 obtains, by employing the performance monitoring function, for example, an operating system operated by the WAS 120, the amount consumed of one or a plurality of application server resources, which are owned by the WAS 120 and which are resources to be used by the application programs 134, and obtains statistics for the amounts consumed of the application server resources. Then, when the amount consumed of one application server resource does not fall within a permissible range, the process load acquisition unit 142 notifies the load control server 160 of a system resource, high load event that indicates the processing load for the application server resource is possibly overloaded. During the above processing, the process load acquisition unit 142 may obtain the amount consumed by the application server resource for each application program 134, and when the amount consumed by the application program 134 does not fall within the permissible range, may provide a notification, for the load control server 160, of a system resource high load event. Or instead of this, the process load acquisition unit 142 may obtain the total amount consumed by the application server resources for all the application programs 134, and when the consumed amount is not within the permissible range, may provide a notification, for the load control server 160, of a system resource high load event.

The server load controller 144 performs the load control, imposed on the WAS 120, in accordance with the load control process performed by the load control server 160. As the load control for the WAS 120, the server load controller 144, in this mode, changes the multiplicity of application program 134.

The DBS 150 includes the DB 152, DB process request I/Fs 153, a DB engine 154, a process load acquisition unit 156 and a server load controller 158. Data to be accessed by the individual application programs 134 are stored in the DB 152. The plurality of DB process request I/Fs 153 are arranged in consonance with the DB connections 139, and serve as connection junctures where the WAS 120 issues an access request for the DB 152. In this mode, the WAS 120 is connected to the DB process request I/F 153 consonant with a user ID that differs in accordance with the priority level of each of the plurality of application programs 134. Therefore, based on the user ID, the DBS 150 can identify the priority level of the application program 134 that has issued the access request.

The DB engine 154 accesses the DB 152 based on an access request, such as a SQL command, that each of the plurality of WASs 120 has issued based on an instruction for each of the plurality of application programs 134. The process load acquisition unit 15 obtains, by employing the performance monitoring function of an operating system operated by the DBS 150, for example, the amount consumed of one or a plurality of database server resources that are owned by the DBS 150 and that are used by the application program 134 to access the DB 152, and obtains the statistics for the amount consumed of the database server resources. Then, when the amount consumed for one database server resource is not within a permissible range, the process load acquisition unit 156 notifies the load control server 160 that a system resource high load event has occurred that indicates the processing load for the database server resource is high. In the above processing, the process load acquisition unit 156 may obtain the amount consumed of the database server resource provided for each DB process request I/F 153, and when the amount consumed by the corresponding application program 134 is not within the permissible range, may provide a notification for the load control server 160 of a system resource high load event. Or instead of this, the process load acquisition unit 156 may obtain the total amount of the database server resources consumed by all the DB process request I/Fs 153, and when the amount consumed is not within the permissible range, may provide a notification for the load control server 160 of a system resource high load event.

The server load controller 158 controls a load imposed on the DBS 150 in accordance with the load control process performed by the load control server 160. As the load control for the server load controller 158, the server load controller 158 in this mode changes the priority levels for the DB process request I/Fs 153 for accessing the DB 152.

The load controller 160 includes a process time monitoring unit 165, a bottleneck identification unit 170, a process load monitoring unit 190 and a load controller 175. The process time monitoring unit 165 monitors, for each of the WASs 120, the processing time required by each application program 134 to process a transaction. The process time monitoring unit 165 employs a service level deterioration event, received from each of the WASs 120, to detect whether the transaction processing time exceeds the permissible range.

The bottleneck identification unit 170 employs the monitoring results obtained for the processing times of transactions on the plurality of WASs 120 to identify a bottleneck in at least one of the WASs 120 or in the DBS 150. The process load monitoring unit 190, for each of the WASs 120, monitors the amount consumed by one or a plurality of application server resources and the amount consumed by one or a plurality of database server resources. In this mode, based on the system resource high load events received from the WASs 120 and the DBS 150, the process load monitoring unit 190 detects whether the amount consumed of an application server resource or a database server resource, identified by the system resource high load event, exceeds the permissible range.

When a bottleneck is identified in at least one of the WASs 120 or the DBS 150, the load controller 175 performs the load control process to remove the bottleneck from the server whereat the bottleneck has been identified.

The load controller 175 includes a load control information storage unit 177, a load control information acquisition unit 179 and a load control processor 181. In the load control information storage unit 177, load control information, for designating the load control process to be performed by the load control processor 181 of the load controller 175, is stored, in correlation with the server that has been identified as having a bottleneck and a resource that has been detected as being a high load for the pertinent server. Further, the load control information storage unit 177 stores the groups of application programs 134, the priority levels of the groups and multiplicity information indicating multiplicities that can be designated for the application programs 134. The load control information acquisition unit 179 obtains, from the load control information storage unit 177, load control information that is related to the server identified as having a bottleneck by the bottleneck identification unit 170, and that is consonant with the resource that has been determined to be a high load by the process load monitoring unit 190. Thereafter, the load control information acquisition unit 179 outputs the load control information to the load control processor 181. The load control processor 181 then performs the load control process designated in the load control information in order to remove the bottleneck for the server thus identified. During the load control process, the load control processor 181 transmits a server load control instruction to the server load controller 144 in the WAS 120 or to the server load controller 158 in the DBS 150, which is a load control target.

According to the information system 10 described above, the transaction processing time required by each of the application servers 120 and the process load imposed on each application server 120 and the database 150 are monitored, and based on the monitoring results, a load control process for removing a bottleneck can be appropriately selected and performed.

The bottleneck identification processing performed by the information system 10 in this mode is shown in FIG. 2.

First, the process time monitoring unit 165 receives, from one or the plurality of WASs 120, a notification provided for one or a plurality of service level deterioration events, and detects whether the transaction processing time exceeds the permissible range. The bottleneck identification unit 170 identifies the location of a bottleneck based on the monitoring results obtained for the processing times for the plurality of WASs 120. More specifically, the bottleneck identification unit 170 identifies the location of a bottleneck based on the monitoring results obtained for the processing times for individual application programs 134 for each WAS 120.

First with the plurality of WASs 120 being N WASs such that N is at least 2, under a condition wherein the processing time exceeds a permissible range (i.e., permissible processing time range) for I WASs of the N WASs such that I is at least 1 and such that I is equal to or greater than one WAS 120 to equal to or smaller than a threshold number (M) of WASs 120 (step S200: Yes), a bottleneck is identified in a WAS 120 for which the processing time is not within the permissible range (S220). At this time, for I WASs equal to or greater than one WAS 120 to equal to or smaller than the threshold number (M) of WASs 120, in a case wherein the processing time does not fall within the permissible range (S200: Yes), and under a condition wherein, for a WAS 120 for which the processing time is not within the permissible range, the processing time required by another application program 134 is also not within the permissible range (S210: Yes), the bottleneck identification unit 170 may identify the pertinent WAS(s) 120

(S220) as having a bottleneck. Or when the processing time required by another application program 134 is within the permissible range (S210: No), a resource related to a specific entry for a transaction for this application program 134 may be identified as a bottleneck (S230). The threshold value for the number of WAS 120 is smaller than the number of WASs 120, and may be designated in advance, for example, by the administrator of the information system 10.

When the processing times for I WASs exceeding the threshold number (M) of WASs 120 (i.e., I>M) are not within the permissible range (S200: No, S240: Yes), the DBS 150 is identified as having a bottleneck, which is a common resource for the entire information system 10. At this time, in a case wherein, for I WASs exceeding the threshold number of WASs 120 are not within the permissible range (S200: No, S240: Yes), and under a condition wherein, for the same WASs 120, the processing time required for another transaction is also not within the permissible range (S250: Yes) and the bottleneck identification unit 170 may identify the DBS 150 (S260) as having a bottleneck. Or when the processing times required by the other types of transaction are within the permissible range (S250: No), a resource related to a transaction consonant with the pertinent application program 134 may be identified as a bottleneck (S270).

The bottleneck identification unit 170 in this mode performs the above described processing either for each application program 134 or for each group of application programs 134. That is, under a condition wherein the processing time required by one application program 134 or by one of the application programs 134 belonging to a group is not within the permissible range, the bottleneck identification unit 170 identifies a bottleneck in a WAS 120 for the pertinent application program 134, or in one of the application programs 134 that belong to the pertinent group. More specifically, when the processing time required by one application program 134 or the application programs belonging to one group does not fall within the permissible range for equal to or smaller than the threshold number of WASs 120, the bottleneck identification unit 170 identifies a bottleneck in these WASs 120. As for more than the threshold number of the WASs 120, when the process time required either by one application program 134 or by the application programs belonging to one group exceeds a predesignated permissible range, the DBS 150 is identified as having a bottleneck.

According to the above described bottleneck identification unit 170, the WAS(s) 120 for which the processing time does not fall within the predesignated permissible range can be identified as having a bottleneck. More specifically, the bottleneck identification unit 170 identifies the WAS(s) 120 as having a bottleneck under a condition wherein the number of the WASs 120, for which the processing time does not fall within the permissible range, is equal to or smaller than a threshold value. When the number of WASs 120 for which the processing time does not fall within the permissible range exceeds the threshold value, the DBS 150 can be identified as having a bottleneck. That is, when the threshold value is, for example, 1, and when the number of WASs 120 for which the processing time does not fall within the permissible range is one, the bottleneck identification unit 170 identifies this WAS 120 as having a bottleneck. When the number of WASs 120 is two or more, the DBS 150 can be identified as having a bottleneck. Further, when the threshold value is, for example, (the number of WASs 120-1), and when the processing times for all the WASs 120 do not fall within the permissible range, the DBS 150 is identified as having a bottleneck. And when the processing time does not fall within the permissible range for a number of WASs 120 that is one or less than the number of WASs, these WASs 120 can be identified as having a bottleneck.

As a result, the information system 10 can determine whether the service level for a specific WAS 120 has been lowered, or whether the DBS 150 used in common by the entire information system 10 has become a bottleneck that can cause the deterioration of the service levels of multiple WASs 120, and can appropriately identify the location of the bottleneck. At this time, the bottleneck identification unit 170 may employ a condition other than S210 or S250, etc., to designate a more detailed location of the bottleneck.

During the above processing, the permissible range of the processing times may be determined based, for example, on the following predesignated reference. Specifically, when a predesignated number or more of transactions are processed by certain application program 134 during a predesignated period, such as sixty seconds, and when the processing time required by the application program 134 to process a predesignated ratio, such as 50%, of the transactions exceeds the permissible processing time, the process time monitoring unit 165 determines that the processing time required by the application program 134 exceeds the permissible range. In this case, the permissible processing time is defined by adding an offset time, which is determined based on a standard deviation, to the average processing times per transaction during peak loads during a period, such as the past month.

The high load determination method employed by the information system 10 in this mode is shown in FIG. 3. When establishing conditions that are designated by "detection conditions" that correspond to a plurality of resources to be monitored, the process load acquisition unit 142 and the process load acquisition unit 156 detect the imposition of a high load on these resources. And when the detection of a high load imposed on the pertinent resource is performed while the condition, such as the number of times, designated by the "determination condition" is satisfied, the amount of the resource consumed exceeds the permissible range (i.e., permissible load range) and the high load state is determined. Then, a system resource high load event for the pertinent resource is transmitted to the process load monitoring unit 190. Furthermore, when the resource high load notification has been transmitted, and when the detection of the high load imposed on the resource is not performed while the condition, such as the number of times, designated by the "cancel condition" is satisfied, a system resource high load cancel event, indicating that a high load is no longer imposed on the pertinent resource, is transmitted to the process load monitoring unit 190. Upon receiving this event, the process load monitoring unit 190 determines that the high load is no longer imposed on the system resource.

The process load acquisition unit 156 employs the "detection condition", the "determination condition" and the "cancel condition" to determine whether a high load is imposed on each of a plurality of database server resources, each of which are described as a "resource used in common (DBS)" in the "type of location of bottleneck" column. In this case, the process load acquisition unit 156 in this mode employs the conditions to determine whether a high load is imposed on each of a plurality of database server resources, including a processor, a disk, a memory and a database buffer.

As for a processor, there are a disk to store a database, a disk to store the access log of the DB 152 and a disk to store a file other than the database and the access log, and the process load acquisition unit 156 detects a high load when the usage rate for the database resource is "equal to or more than x % for n seconds, on average". When this high load state is repeatedly detected m times during a monitoring period, the process load acquisition unit 156 determines that a high load has been imposed on the database resource, and transmits a system resource high load event to the process load monitoring unit 190. Further, when the high load state is not repeatedly detected f times after the system resource high load event has been transmitted to the process load monitoring unit 190, the process load acquisition unit 156 transmits a system resource high load cancel event to the process load monitoring unit 190.

Furthermore, when paging for the real memory mounted in the DBS 150 has occurred "equal to or more than x times for n seconds, on average", it is assumed that a large amount of the memory has been consumed and swaps occur frequently, and a high load is detected. In addition, when the buffer miss ratio for a database buffer used by the DB engine 154 is "equal to or more than x % for n seconds, on average", it is assumed that the buffer size is insufficient, and a high load is detected. The process load acquisition unit 156 then performs a notification for the system resource high load event and the system resource high load cancel event for these database server resources, in the same manner as for the system resource high load event and the system resource high load cancel event for the processor, etc.

The process load acquisition unit 142 on each WAS 120 employs the "detection condition", the "determination condition" and the "cancel condition" to determine whether a high load has been imposed on each of a plurality of application server resources, which are described using "WAS" in the "type of location of bottleneck" column. At this time, the process load acquisition unit 142 in this mode employs the "detection condition", the "determination condition" and the "cancel condition" to determine whether a high load has been imposed on each database server resource, such as a processor, a disk, a memory and a JVM (Java Virtual Machine) memory and on each of a plurality of application servers, including DB connections.

The process load acquisition unit 142, as well as the process load acquisition unit 156, performs the detection of a high load and the transmission of an event for the processor, the disk and the memory. Further, when the JVM, which executes various programs or modules constituting the web application sever 130, performs "garbage collection equal to or more than x times, for n seconds", the process load acquisition unit 142 assumes that a memory allocated to the JVM is too small and detects a high load. And the process load acquisition unit 142 transmits a notification for a system resource high load event and a system resource high load cancel event for the JVM memory, in the same manner as for the notification of the system resource high load event and the system resource high load cancel event for the processor, etc.

Further, when the multiplicity for which the DB connections 139 are employed has reached the upper limit, the process load acquisition unit 142 assumes that the DB connections are insufficient and detects a high load. When the process load acquisition unit 142 detects that a high load has been imposed on the DB connections, the process load acquisition unit 142 transmits a system resource high load event to the process load monitoring unit 190, and until the pertinent WAS 120 is halted, does not transmit to the process load monitoring unit 190 a notification indicating that a high load is no longer imposed.

Furthermore, the process load acquisition unit 142 employs the "detection condition", the "determination condition" and the "cancel condition" to determine whether, due to the affect of the process of the application program 134, a high load has been imposed on each of the resources, such as the processor of the WAS 120, the processor of the DBS 150 and the disk of the DBS 150, which are described as the "resources related to the transaction" in the "type of location of bottleneck" column.

When the rate of the processing time required by the DBS 150 to access the DB 152 is equal to or lower than x % for the entire processing time during which the processor of the WAS 120 executes the application program 134 in consonance with the transaction, the process load acquisition unit 142 assumes that the rate of the processing time required by the processor of the WAS 120 is high, and detects a high load. And when a high load is detected, the process load acquisition unit 142 transmits a system resource high load event to the process load monitoring unit 190. When the state indicated by the detection condition does not occur for n seconds, a system resource high load cancel event is transmitted to the process load monitoring unit 190.

Moreover, when the rate of the processing time required by the DBS 150 to access the DB 152 is equal to or higher than x % of the entire processing time during which the processor of the DBS 150 executes the application program 134 in consonance with the transaction, the process load acquisition unit 142 assumes that the rate of the process time required by the processor of the DBS 150 is high, and detects a high load. When a high load is detected, the process load acquisition unit 142 transmits a system resource high load event to the process load monitoring unit 190. And when the detection of a high load does not occur for n seconds, a system resource high load cancel event is transmitted to the process load monitoring unit 190. When the system resource high load event is received, and when it is identified by the DBS 150 within n seconds that the processor of the DBS 150 is a bottleneck, the process load monitoring unit 190 determines that a high load has been imposed on the processor of the DBS 150 in consonance with the transaction. Further, in the same manner as for the processor of the DBS 150, the process load acquisition unit 142 determines that a high load has been imposed on the disk of the DBS 150 in consonance with the transaction.

The process load monitoring unit 190 employs the system resource high load event and the system resource high load cancel event described above as examples to determine whether a high load has been imposed on each of a plurality of resources owned by each of the WASs 120 and the DBS 150. At this time, the process load monitoring unit 190 may hold the "detection condition", the "determination condition" and the "cancel condition", which correspond to each of the resources, as files, for example, stored in the storage devices of the load control server 160, and these conditions may be changed based on an instruction entered by the administrator of the information system 10, etc.

Moreover, when a system resource high load event is transmitted for each application program 134 by the process load acquisition unit 142, and when the system resource high load event is transmitted for each DB process request I/F 153 by the process load acquisition unit 156, the bottleneck identification unit may identify more precisely an application program 134 that causes a bottleneck.

An example of load control information stored in the load control information storage unit 177 according to this mode is shown in FIG. 4. In correlation with a plurality of application server resources for each WAS 120 and for each of a plurality of database server resources for the DBS 150, the load control information storage unit 177 stores load control information for designating a load control process that the load controller 175 should perform when a bottleneck is identified in a server that owns the pertinent resource, and when the amount consumed of the resource is not within a predesignated permissible range. In this case, the load control information storage unit 177 may store at least one set of load control information, information for designating a plurality of load control processes and the priority rankings for the load control processes.

When the amount consumed of a resource owned by a server whereat a bottleneck is identified is not within a predesignated permissible range, the load control information acquisition unit 179 identifies the pertinent resource as a bottleneck. When the resource is identified as a bottleneck, in correlation with the resource, the load control information acquisition unit 179 obtains load control information stored in the load control information storage unit 177. More specifically, when a bottleneck is identified in a WAS 120, the load control information acquisition unit 179 obtains load control information stored in the load control information storage unit 177, in correlation with one of a plurality of application server resources owned by the WAS 120, and the amount that has been consumed is determined by the process load monitoring unit 190 to not be within the permissible range. Further, when a bottleneck is identified in the DBS 150, the load control information storage unit 179 obtains load control information stored in the load control information storage unit 177, in correlation with one of a plurality of database server resources, the amount of which has been consumed is determined by the process load monitoring unit 190 to not be within the permissible range.

And in order to remove the bottleneck in the server for which the bottleneck has been identified by the bottleneck identification unit 170, the load control processor 181 performs the load control process designated by the load control information that is obtained by the load control information acquisition unit 179. In this case, when a specific load control process designated by specific load control information has been performed, and when it is detected that the bottleneck at the server, for which the bottleneck has been identified, has not been resolved during a predesignated period of time, the load control processor 181 performs another load control process having a lower priority rank than the specific load control process designated by the load control information. In this manner, when the bottleneck is not resolved by using one type of load control process, the load control processor 181 can perform another load control process, so that the bottleneck can be removed more effectively.

The load control processor 181 in this mode performs the following load control processes.

(1) Load Control Process 1

The load control processor 181 reduces multiplicities of the application programs 134 of a group having a lower priority level than the application programs 134 for which it has been determined that the processing time is not within the permissible range. More specifically, the load control processor 181 obtains from the bottleneck identification unit 170, via the load control acquisition unit 179, a plurality of group identifiers for groups that have lower priority levels than an application program 134, for which it has been determined that the processing time is not within the permissible range. Then, the load control processor 181 designates the obtained group identifiers, and transmits an instruction to the server load controller 144 to reduce the multiplicities of other application programs 134 that have lower priority levels than the application program 134. Upon receiving this instruction, the server load controller 144 reduces the maximum value that indicates the number of application programs 134 that the multiplicity controller 132 operates concurrently, so that the multiplicities of the other application programs 134 can be reduced.

In a case wherein a bottleneck has be identified in the DBS 150, the load control processor 181 performs the above described load control process 1 for each of the WASs 120 included in the information system 10. Therefore, the load control processor 181 can reduce the multiplicities according to which all the WASs 120 accept transactions, and can reduce accordingly the total amount of transactions processed by the information system 10, so that the number of accesses for the DB 152 can be reduced.

(2) Load Control Process 2

The load control processor 181 performs a greater reduction of the priority level of the process for accessing the DB 152 based on a request received from the application programs 134 of a group having a lower priority level than an application program 134 for which the processing time is determined to not be within the permissible range. More specifically, the load control processor 181 obtains from the bottleneck identification unit 170, via the load control information acquisition unit 179, a plurality of group identifiers for groups that have lower priority levels than an application program 134 for which the processing time has been determined to not be within the permissible range. Then, the load control processor 181 designates the obtained group identifiers, and transmits an instruction to the server load controller 158 to reduce the priority levels for accessing the DB 152 based on requests from the other application programs 134 that have lower priority levels than the first application program 134 has. Upon receiving this instruction, the server load controller 158 reduces the process execution priority levels of the corresponding DB process request I/Fs 153.

(3) Load Control Process 3

When the bottleneck identification unit has identified, by using a system resource high load event, an application program 134 that causes a high load to be imposed on the resource that is a bottleneck in a server wherein the bottleneck is present, the load control processor 181 reduces the multiplicity of the group the application program 134 belongs to. More specifically, the load control processor 181 obtains from the bottleneck identification unit 170, via the load control information acquisition unit 179, the group identifier of a group for the application program 134 that causes a bottleneck. Then, the load control processor 181 designates the obtained group identifier, and transmits an instruction to the server load controller 144 to reduce the multiplicity of the pertinent application program 134. Upon receiving this instruction, the server load controller 144 reduces the maximum value that indicates the number of application programs 134 that the multiplicity controller 132 operates concurrently, so that the multiplicity of the other application program 134 is reduced.

In a case wherein a bottleneck is identified in the DBS 150, the load control processor 181 performs the above described load control process 3 for each of the plurality of WASs 120 included in the information system 10. As a result, the load control processor 181 can reduce the multiplicities of all the WASs 120 that accept transactions, and accordingly, can reduce the total number of transactions processed by the information system 10, so that the number of accesses of the DB 152 can be reduced.

(4) Load Control Process 4

When the bottleneck identification unit 170 has identified, by using a system resource high load event, an application program 134 that causes a high load to be imposed on the resource that is a bottleneck in a server wherein the bottleneck is present, the load control processor 181 reduces the priority level of a process for accessing the DB 152, based on a request issued by application programs 134 of a group that executes the pertinent application program 134. More specifically, the load control processor 181 obtains from the bottleneck identification unit 170, via the load control information acquisition unit 179, the group identifier of an application program 134 that has caused a bottleneck. Then, the load control processor 181 designates the obtained group identifier, and transmits an instruction to the server load controller 158 to reduce the priority level of a process for accessing the DB 152, based on a request from the application programs 134 in the group that the pertinent application program 134 belongs to. Upon receiving this instruction, the server load controller 158 reduces the process execution priority level of the corresponding DB process request I/F.

(5) Load Control Process 5

The load control processor 181 reduces the multiplicity of an application program 134 for which the processing time has been determined not to be within the permissible range. More specifically, the load control processor 181 obtains from the bottleneck identification unit 170, via the load control information acquisition unit 179, the group identifier of an application program 134 for which the processing time has been determined to not be within the permissible range. Then, the load control processor 181 designates the group identifier of the application program 134, and transmits an instruction to the server load controller 144 to reduce the multiplicity of the pertinent application program 134. Upon receiving this instruction, the server load controller 144 decrements the maximum value that indicates the number of application programs 134 the multiplicity controller 132 operates concurrently, so that the multiplicities for the execution of the application programs 134 can be reduced.

In a case wherein a bottleneck is identified in the DBS 150, the load control processor 181 performs the above control process 3, in the same manner as the load control process 1, for each of the plurality of WASs 120 included in the information system 10.

(6) Load Control Process 6

The load control processor 181 reduces the priority level of a process for accessing the DB 152, based on a request received from an application program 134 for which the processing time has been determined not to be within the permissible range. More specifically, the load control processor 181 obtains from the bottleneck identification unit 170, via the load control information acquisition unit 179, the group identifier of an application program 134 for which the processing time has been determined not to be within the permissible range. Then, the load control processor 181 designates the group identifier of the pertinent application program 134, and transmits an instruction to the server load controller 158 to reduce the priority level of the process for accessing the DB 152, based on the request received by the application program 134. Upon receiving this instruction, the server load controller 158 reduces the process execution priority level of the corresponding DB process request I/F 153.

In this mode, for a bottleneck in the DBS 150, the load control information shown in FIG. 4 is stored in the load control information storage unit 177, depending on whether the amount consumed of one of the database server resources exceeds the permissible range.

More specifically, in correlation with when the amount consumed of the processor resource exceeds the permissible range, the load control information storage unit 177 stores load control information indicating that the load process processes 3, 1, 4, 2, 5 and 6 are to be performed in this priority order. Further, in correlation with when the amount consumed of a disk on which the database is stored exceeds the permissible range, the load control information storage unit 177 stores load control information indicating that the load control processes 2, 1, 6 and 5 are to be performed in this priority order. Furthermore, when the amount consumed of a disk on which the access log is stored exceeds the permissible range, the load control information storage unit 177 stores load control information indicating that the load control processes 1, 2, 5 and 6 are to be performed in this priority order. In addition, in correlation with when the amount consumed of a disk, a memory or a database buffer in which items other than the database and the access log are stored exceeds the permissible range, the load control information storage unit 177 stores load control information indicating that the load control processes 1 and 5 are to be performed in this priority order.

When, for example, a bottleneck is identified in the DBS 150, and further, when the amount consumed of the processor resource exceeds the permissible range and the processor is identified as a bottleneck, and an application program 134, for which the amount consumed of the processor resource of the DBS 150 is not within the permissible range, can be identified, the load controller 175 performs the load control process 3 by employing the load control information. Then, the load controller 175 reduces the multiplicities for which the WAS 120 executes the pertinent application program 134 and the application programs 134 that belong to the same the group as this application program 134. When the bottleneck in the DBS 150 is not resolved through this load control process, the load controller 175 performs the load control process 1, so that the multiplicities can be reduced for which the WAS 120 executes other application programs 134 that belong to the other groups having a lower priority level than that of the pertinent application program 134. Through these processes, first, the load controller 175 reduces the amount of processing performed by the application program 134 that greatly consumes the processor resource, to attempt to reduce the load imposed on the DBS 150. When the bottleneck has still not been resolved, the amount of processing performed by an application program 134 that has a priority level lower than that of the pertinent application program 134 is reduced, so that the load imposed on the DBS 150 can be gradually lowered.

When the bottleneck has not yet been removed using these load control processes, the load controller 175 sequentially performs the load control processes 4 and 2, so that it reduces the adverse effect of another process handling requests on the DBS 150, and it attempts to increase the service level. So long as this is not a problem for the application program 134 for which the processing time is initially determined not to be within the permissible range, or a problem for an application program 134 that has a higher priority level, it is presumed that the bottleneck can be removed by using the above mentioned load control. However, when a response time has still not been improved, the load control process 5 can be performed to reduce the multiplicity with which the WAS 120 executes the application program 134 for which the service level is lowered, so that the load imposed on the DBS 150 can be further reduced. When the response has still not been improved by using the load control process 5, the load controller 175 performs the load control process 6, and reduces the priority level of the processes for accessing the DB 152, based on requests received from the application program 134. As a result, the adverse affect that a request handled by the DBS 150 provides for another process can be reduced.

When, for another example, a bottleneck is identified in the DBS 150 and a disk on which a database is stored is identified as a bottleneck, and when an application program 134, for which the amount consumed of the disk resource for the DBS 150 is not within the permissible range is identified, the load controller 175 performs the load control process 2. Then, the load controller 175 reduces the priority level of the processes for accessing the DB 152, based on requests by application programs 134 that belong to a group having a lower priority level than that of the pertinent application program 134. At this time, when there is a plurality of disks on which the database is stored, it is preferable, in the load control process 2, that the load controller 175 reduce the priority level of the processes for accessing the DB 152, based on requests by an application program 134 that belongs to a group having a lower priority level than that of the pertinent application group 134 and that employs a disk on which the database used by the pertinent application program 134 is stored. When the bottleneck in the DBS 150 is not resolved by using the load control process 2, the load controller 175 sequentially performs the load control processes 1, 6 and 5 until the bottleneck in the DBS 150 has been resolved.

Furthermore, in this mode, for a bottleneck in the WAS 120, the load control information shown in FIG. 4 is stored in the load control information storage unit 177, depending on whether the amount consumed of one of a plurality of application server resources exceeds the permissible range.

More specifically, in correlation with when the amount consumed of the processor resource exceeds the permissible range, the load control information storage unit 177 stores load control information indicating that the load process processes 3, 1 and 5 are to be performed in this priority order. Further, in correlation with when the memory, the disk(s), the JVM memory and the DB connections exceed the permissible range, the load control information storage unit 177 stores load control information indicating that the load control processes 1 and 5 are to be performed.

When, for example, a bottleneck is identified in the WAS 120, and further, when the amount consumed of the processor resource exceeds the permissible range and the processor is identified as a bottleneck, and an application program 134, for which the amount consumed of the processor resource of the WAS 120 is not within the permissible range, can be identified, the load controller 175 performs the load control process 3 by employing the load control information. Then, the load controller 175 reduces the multiplicities with which the WAS 120 executes the pertinent application program 134 and the application programs 134 that belong to the same the group as this application program 134. When the bottleneck in the WAS 120 is not resolved by using this load control process, the load controller 175 performs the load control process 1, so that the multiplicities can be reduced with which the WAS 120 executes other application programs 134 that belong to a group having a lower priority level than the pertinent application program 134.

So long as this is not a problem for the application program 134 for which the processing time is initially determined to not be within the permissible range, or a problem for an application program 134 that has a higher priority level, it is presumed that the bottleneck can be removed by using the above mentioned load control. However, when a response time has still not been improved, the load controller 175 can perform the load control process 5 to reduce the multiplicity with which the WAS 120 executes the application program 134 for which the service level is lowered, so that the load imposed on the DBS 150 can be further reduced.

In addition, as for a bottleneck involving a resource related to the processing contents of a transaction or the processing contents of an application program 134, the load control information storage unit 177 in this mode stores load control information indicating that the load control process 5 should be performed when the amount consumed of the processor resource of the WAS 120 exceeds the permissible range. Moreover, as for a bottleneck concerning a resource related to the processing contents of a transaction or the processing contents of an application program 134, the load control information storage unit 177 stores load control information indicating that the load control processes 5 and 6 should be performed in this priority order when the amount consumed of the processor resource or of the disk of the DBS 150 exceeds the permissible range.

FIG. 5 is a diagram showing an example hardware configuration for a computer 900 according to the mode of the present invention. The computer 900 according to this mode functions, for example, as a load control server 160 by executing a load control program. The computer 900 comprises: a CPU peripheral section, including a CPU 1000, a RAM 1020, a graphic controller 1075 and a display device 1080 that are interconnected by a host controller 1082; an input/output section, including a communication interface 1030, a storage device 1040 and a CD-ROM drive 1060 that are connected to the host controller 1082 by an input/output controller 1084; and a legacy input/output section, including a ROM 1010, a flexible disk drive 1050 and an input/output chip 1070 that are connected to the input/output controller 1084.

The host controller 1082 connects the RAM 1020 to the CPU 1000, which accesses the RAM 1020 at a high transfer rate, and the graphic controller 1075. The CPU 1000 is operated based on programs stored in the ROM 1010 and the RAM 1020, and controls the individual sections. The graphic controller 1075 obtains image data that the CPU 1000 generates in a frame buffer in the RAM 1020 and displays as image data on the display device 1080. Instead of this, the graphic controller 1075 may internally include a frame buffer for storing image data generated, for example, by the CPU 1000.

The input/output controller 1084 connects the host controller 1082 to the communication interface 1030, which is a comparatively fast input/output device, the storage device 1040 and the CD-ROM drive 1060. The communication interface 1030 communicates with an external device via a network. The storage device 1040 stores programs and data used by the computer 900. And the CD-ROM drive 1060 reads programs or data from a CD-ROM 1095 and provides the programs or data for the storage device 1040.

Further, the ROM 1010 and comparatively slow input/output devices, such as the flexible disk drive 1050 and the input/output chip 1070, are connected to the input/output controller 1084. The ROM 1010 includes, for example, a boot program that is executed when the computer 900 is activated and programs that depend on the hardware of the computer 900. The flexible disk drive 1050 reads a program or data from a flexible disk 1090, and provides the program or the data for the storage device 1040 via the RAM 1020. And the input/output chip 1070 connects the flexible disk drive 1050, or various types of input/output devices, via a parallel port, a serial port, a keyboard port and a mouse port, for example.

Programs provided for the computer 900, via the RAM 1020, are recorded on a flexible disk 1090, in the CD-ROM 1095 or on another recording medium, such as an IC card, and are to be employed by a user. The programs that permit the WAS 120 to function as the HTTP server 125, the Web application server 130, the process time acquisition unit 140, the process load acquisition unit 142 and the server load controller 144 are read from a recording medium, are installed in the WAS 120 via the communication interface 1030, and are executed by a server computer that is employed as the WAS 120. Furthermore, the programs that permit the DBS 150 to function as the DB 152, the DB process request I/F 153, the process load acquisition unit 156 and the server load controller 158 are read from a recording medium, may be installed in the DBS 150 via the communication interface 1030 and the load control server 160, and are executed by a server computer that are employed as the DBS 150. In addition, the load control program that permits the computer 900 to function as the load control server 160 is read from a recording medium, and is installed in the storage device 1040 of the computer 900, and is executed by the CPU 1000.

The programs installed in the WASs 120 includes: an HTTP server program; a Web application server program including a multiplicity control module and a DB access control module; a process time acquisition module; a process load acquisition module; and a server load control module. These programs and modules permit individual WASs 120 to serve as the HTTP server 125, the Web application server 130 that includes the multiplicity controller 132 and the DB access controller 136, the process time acquisition unit 140, the process load acquisition unit 142 and the server load controller 144.

The programs installed in the DBS 150 include: a DB engine program, a process load acquisition module and a server load control module. These programs and modules permit the DBS 150 to serve as the DB engine 154, the process load acquisition unit 156 and the server load controller 158.

The load control program, which is installed in the computer 900 and which permits the computer 900 to function as the load control server 160, includes: a process time monitoring module, a bottleneck identification module, a process load monitoring module, and a load control module that includes a load control information acquisition module and a load control process module. This program and these modules permit the computer 900 to function as the process time monitoring unit 165, the bottleneck identification unit 170, the process load monitoring unit 190 and the load controller 175, which includes the load control information acquisition unit 179 and the load control processor 181.

The above described programs and modules may be stored on an external storage medium. This storage medium may not only be a flexible disk 1090 or a CD-ROM 1095, but can also be an optical recording medium, such as a DVD or a PD, a magneto-optical recording medium, such as an MD, a tape medium, or a semiconductor memory, such as an IC card. Furthermore, a storage device, such as a hard disk or a RAM, provided for a server system connected to a special communication network or the Internet may be employed as a recording medium. And a program may be provided for the computer 900 via the network, and then be transmitted from the computer 900 via the load control server 160 to the WAS 120 or the WEB application server 130.

According to the above described information system 10, the load control information storage unit 177 can store appropriate load control processes in correlation with the location of a bottleneck and the resource identified as having a high load. And based on load control information stored in the load control information storage unit 177, the load controller 175 can appropriately perform the load control process, e.g., can change the multiplicity of the application program 134 to be executed by the WAS 120 or can change the priority level of the process for accessing the DB 152.

Furthermore, according to the information system 10, the multiplicity whereby each of the application programs 134 is to be executed and the priority level of an access of the DBS 150 can be appropriately changed in accordance with the processing time required by each of the plurality of application programs 134. Therefore, in a case wherein various types of application systems are operated concurrently by the information system 10, deterioration of the service level provided by a specific application program 134 due to the abnormal consumption of system resources by another application program 134 can be automatically detected, and the service level can be automatically returned to the normal state within a short period of time. Thus, an information system 10 can be provided that has the same robustness as when various types of application programs 134 are performed by separate information systems 10.

The present invention has been described by employing the mode. However, the technical scope of the present invention is not limited to this mode, and it will be obvious to one having ordinary skill in the art that the mode can be variously modified or improved. As is apparent from the claims of the invention, such modifications or improvements can also be included within the technical scope of the invention.

BRIEF DESCRIPTION OF THE DRAWINGS

FIG. 3 Shows a high load determination method employed by the information system 10 according to the mode of the present invention.

FIG. 4 Shows example load control information stored in a load control information storage unit 177 according to the mode of the present invention.

Figure 1:
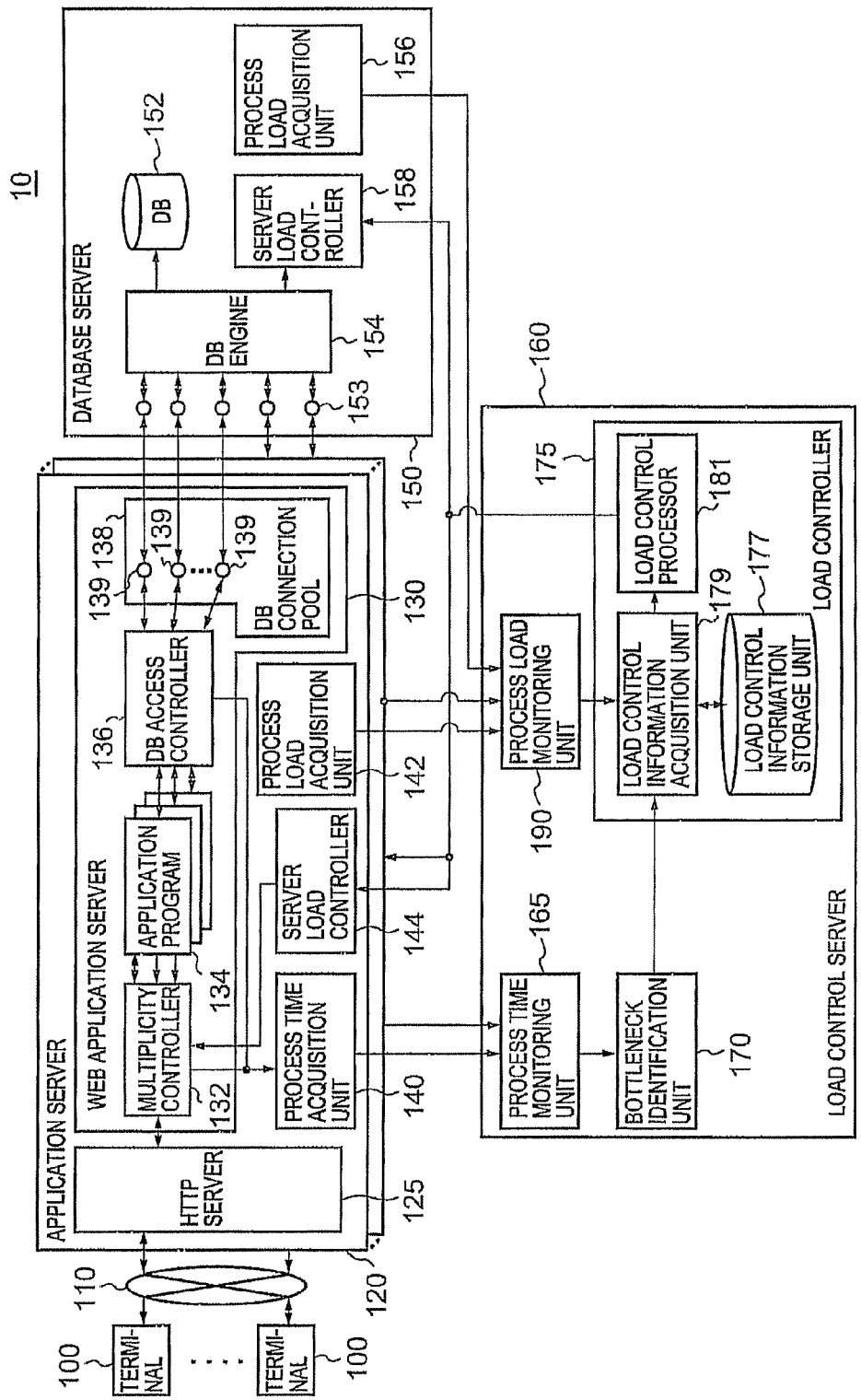
FIG. 1 Shows a configuration for an information system 10 according to one mode of the present invention.
Figure 2:
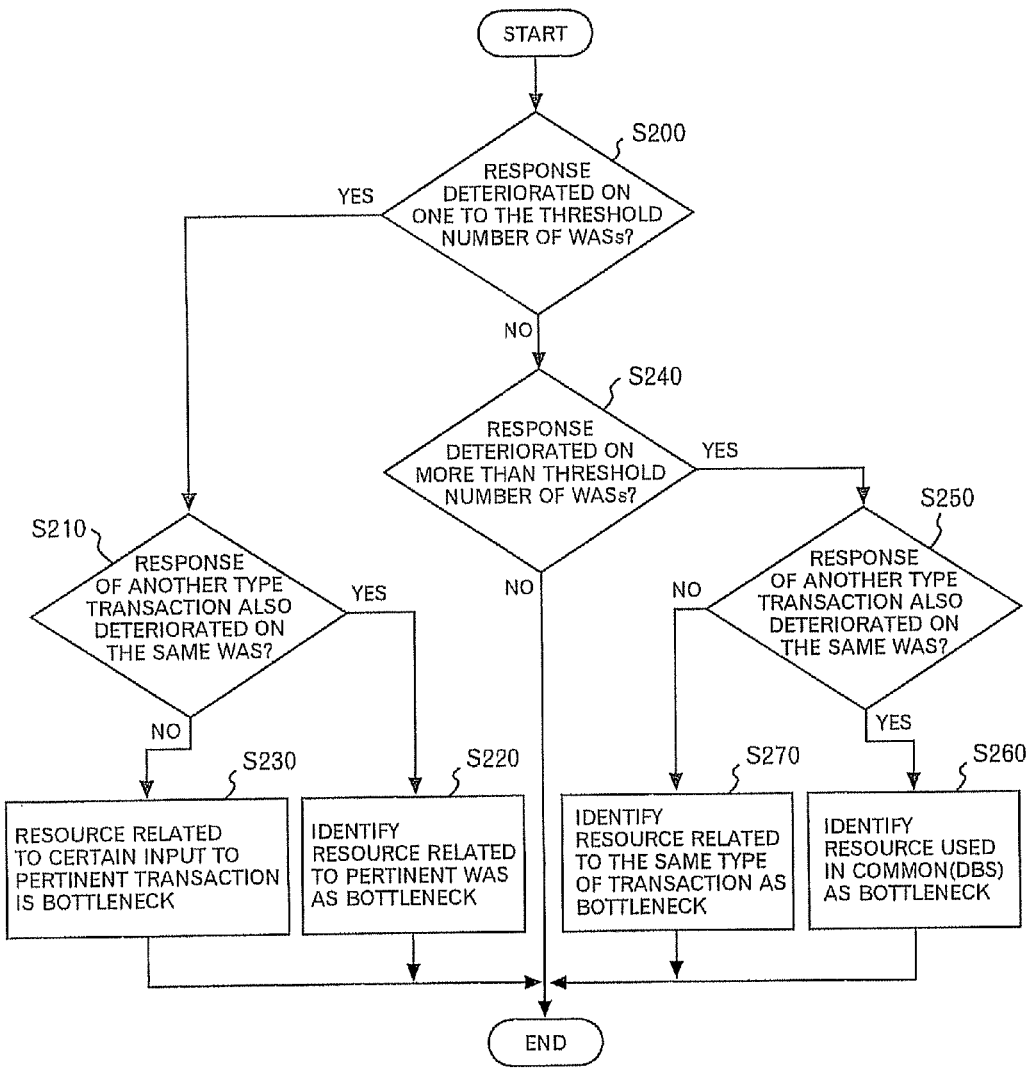
FIG. 2 Shows a bottleneck identification process performed by the information system 10 according to the mode of the present invention.
Figure 5:
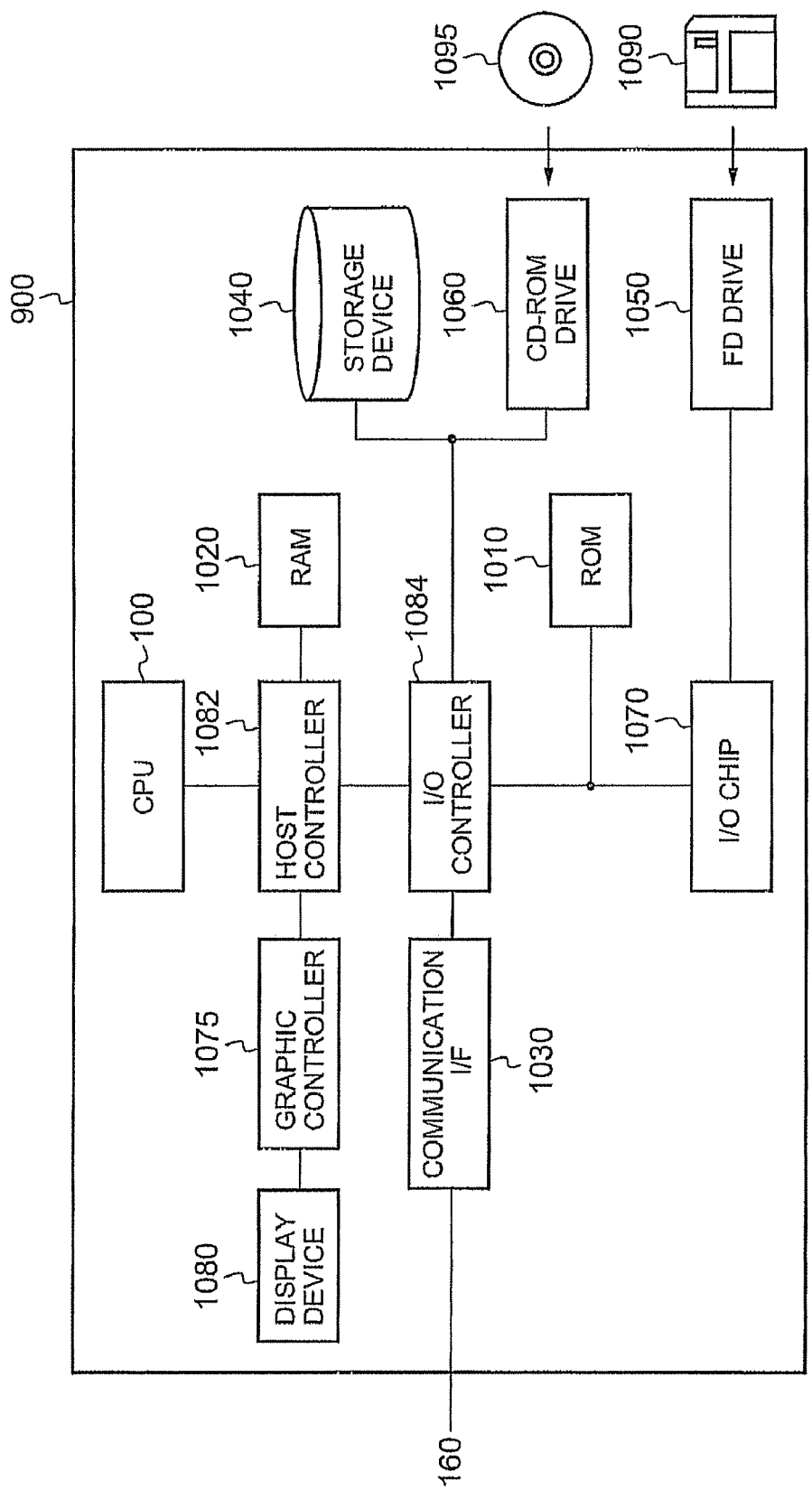
FIG. 5 Shows an example hardware configuration of a computer 900 according to the mode of the present invention.

The invention claimed is:
1. A load control server comprising:
a processor; and
a computer readable memory device containing program code executable by the processor for implementing a method for controlling bottlenecks in an information system;
wherein the information system includes N application servers and a database server,
wherein N is at least 2,
wherein each application server is adapted to execute at least one application program for processing a transaction received by each application server from a terminal,
wherein the database server is adapted to access a database based on a request received from any application server of the N application servers, and
wherein the method comprises:
monitoring a processing time required for each application program to process the transaction received by each application server;
detecting a bottleneck relating to usage of at least one resource, wherein each resource of the at least one resource is independently selected from the group consisting of a resource of at least one application server of the N application servers, a resource related to input to the transaction, a resource of the database server, and a resource related to the transaction, wherein said detecting is responsive to said monitoring having determined that the processing time for processing the transaction by I application servers of the N application servers is not within a predesignated permissible processing time range, and wherein I is at least 1; and removing the detected bottleneck,
   wherein M denotes a predesignated threshold number of application servers, wherein said detecting the bottleneck relating to usage of at least one resource comprises identifying the at least one resource, and
   wherein said identifying the at least one resource comprises independently identifying each resource of the at least one resource as being:
      said resource of at least one application server of the N application servers if I does not exceed M and if a processing time for processing another type of transaction by any application server of the N application servers is not within the predesignated permissible processing time range;
      said resource related to input to the transaction if I does not exceed M and if a processing time for processing another type of transaction by any application server of the N application servers is within the predesignated permissible processing time range;
      said resource of the database server if I exceeds M and if a processing time for processing another type of transaction by any application server of the N application servers is not within the predesignated permissible processing time range;
      said resource related to the transaction if I exceeds M and if a processing time for processing another type of transaction by any application server of the N application servers is within the predesignated permissible processing time range.

2. The load control server of claim 1, wherein the method further comprises monitoring processing loads imposed on: resources of the N application servers, resources of the database server, and resources related to the transaction, and wherein said identifying each resource of the at least one resource comprises determining from the monitored processing loads that a high load specific to each resource of the at least one resource is imposed on each resource of the at least one resource.

3. The load control server of claim 2, wherein said determining that a high load is imposed on each resource of the at least one resource comprises determining that a predesignated detection condition has occurred for each resource of the at least one resource a predesignated number of times, and wherein the predesignated detection condition is that a predesignated usage parameter specific to each resource of the at least one resource is in a predesignated load range.

4. The load control server of claim 2, wherein said removing the detected bottleneck comprises eliminating the high load imposed on each resource of the at least one resource.

5. The load control server of claim 4, wherein said eliminating comprises executing in a predesignated sequence specific to each resource of the at least one resource as many of one or more predesignated load control processes as is necessary to eliminate the high load imposed on each resource of the at least one resource.

6. The load control server of claim 5, wherein a first resource of the at least one resource is a resource of a first application server of the N application servers, wherein said executing the predesignated sequence specific to the first resource comprises reducing an application program multiplicity of the first application server, and wherein said application program multiplicity on the first application server is defined as a maximum number of application programs to be executed concurrently on the first application server with respect to a plurality of transactions of the same type that were received by the first application server at the same time.

7. The load control server of claim 5, wherein a first resource of the at least one resource is a resource of the database server, and wherein said executing the predesignated sequence specific to the first resource comprises reducing a priority level of a process for accessing the database.

8. A computer program product, comprising:
   a computer readable hardware storage device having a computer readable program code stored therein, said program code executable by a processor of a computer system for implementing a method for controlling bottlenecks in an information system;
   wherein the information system includes N application servers and a database server,
   wherein N is at least 2,
   wherein each application server is adapted to execute at least one application program for processing a transaction received by each application server from a terminal,
   wherein the database server is adapted to access a database based on a request received from any application server of the N application servers, and
   wherein the method comprises:
      said processor monitoring a processing time required for each application program to process the transaction received by each application server;
      said processor detecting a bottleneck relating to usage of at least one resource, wherein each resource of the at least one resource is independently selected from the group consisting of a resource of at least one application server of the N application servers, a resource related to input to the transaction, a resource of the database server, and a resource related to the transaction, wherein said detecting is responsive to said monitoring having determined that the processing time for processing the transaction by I application servers of the N application servers is not within a predesignated permissible processing time range, and wherein I is at least 1; and
      said processor removing the detected bottleneck,
   wherein M denotes a predesignated threshold number of application servers, wherein said detecting the bottleneck relating to usage of at least one resource comprises identifying the at least one resource, and
   wherein said identifying the at least one resource comprises independently identifying each resource of the at least one resource as being:
      said resource of at least one application server of the N application servers if I does not exceed M and if a processing time for processing another type of transaction by any application server of the N application servers is not within the predesignated permissible processing time range;
      said resource related to input to the transaction if I does not exceed M and if a processing time for processing another type of transaction by any application server of the N application servers is within the predesignated permissible processing time range;
      said resource of the database server if I exceeds M and if a processing time for processing another type of transaction by any application server of the N application servers is not within the predesignated permissible processing time range;
      said resource related to the transaction if I exceeds M and if a processing time for processing another type of transaction by any application server of the N application servers is within the predesignated permissible processing time range.

9. The computer program product of claim 8, wherein the method further comprises monitoring processing loads imposed on: resources of the N application servers, resources of the database server, and resources related to the transaction, and wherein said identifying each resource of the at least one resource comprises determining from the monitored processing loads that a high load specific to each resource of the at least one resource is imposed on each resource of the at least one resource.

10. The computer program product of claim 9, wherein said determining that a high load is imposed on each resource of the at least one resource comprises determining that a predesignated detection condition has occurred for each resource of the at least one resource a predesignated number of times, and wherein the predesignated detection condition is that a predesignated usage parameter specific to each resource of the at least one resource is in a predesignated load range.

11. The computer program product of claim 9, wherein said removing the detected bottleneck comprises eliminating the high load imposed on each resource of the at least one resource.

12. The computer program product of claim 11, wherein said eliminating comprises executing in a predesignated sequence specific to each resource of the at least one resource as many of one or more predesignated load control processes as is necessary to eliminate the high load imposed on each resource of the at least one resource.

13. The computer program product of claim 12, wherein a first resource of the at least one resource is a resource of a first application server of the N application servers, wherein said executing the predesignated sequence specific to the first resource comprises reducing an application program multiplicity of the first application server, and wherein said application program multiplicity on the first application server is defined as a maximum number of application programs to be executed concurrently on the first application server with respect to a plurality of transactions of the same type that were received by the first application server at the same time.

14. The computer program product of claim 12, wherein a first resource of the at least one resource is a resource of the database server, and wherein said executing the predesignated sequence specific to the first resource comprises reducing a priority level of a process for accessing the database.

15. A method for controlling bottlenecks in an information system, wherein the information system includes N application servers and a database server, wherein N is at least 2, wherein each application server is adapted to execute at least one application program for processing a transaction received by each application server from a terminal, wherein the database server is adapted to access a database based on a request received from any application server of the N application servers, and wherein the method comprises:
monitoring, by a processor of a computer system, a processing time required for each application program to process the transaction received by each application server;
said processor detecting a bottleneck relating to usage of at least one resource, wherein each resource of the at least one resource is independently selected from the group consisting of a resource of at least one application server of the N application servers, a resource related to input to the transaction, a resource of the database server, and a resource related to the transaction, wherein said detecting is responsive to said monitoring having determined that the processing time for processing the transaction by I application servers of the N application servers is not within a predesignated permissible processing time range, and wherein I is at least 1; and
said processor removing the detected bottleneck,
wherein M denotes a predesignated threshold number of application servers, wherein said detecting the bottleneck relating to usage of at least one resource comprises identifying the at least one resource, and
wherein said identifying the at least one resource comprises independently identifying each resource of the at least one resource as being:
said resource of at least one application server of the N application servers if I does not exceed M and if a processing time for processing another type of transaction by any application server of the N application servers is not within the predesignated permissible processing time range;
said resource related to input to the transaction if I does not exceed M and if a processing time for processing another type of transaction by any application server of the N application servers is within the predesignated permissible processing time range;
said resource of the database server if I exceeds M and if a processing time for processing another type of transaction by any application server of the N application servers is not within the predesignated permissible processing time range;
said resource related to the transaction if I exceeds M and if a processing time for processing another type of transaction by any application server of the N application servers is within the predesignated permissible processing time range.

16. The method of claim 15, wherein the method further comprises monitoring processing loads imposed on: resources of the N application servers, resources of the database server, and resources related to the transaction, and wherein said identifying each resource of the at least one resource comprises determining from the monitored processing loads that a high load specific to each resource of the at least one resource is imposed on each resource of the at least one resource.

17. The method of claim 16, wherein said determining that a high load is imposed on each resource of the at least one resource comprises determining that a predesignated detection condition has occurred for each resource of the at least one resource a predesignated number of times, and wherein the predesignated detection condition is that a predesignated usage parameter specific to each resource of the at least one resource is in a predesignated load range.

18. The method of claim 16, wherein said removing the detected bottleneck comprises eliminating the high load imposed on each resource of the at least one resource.

19. The method of claim 18, wherein said eliminating comprises executing in a predesignated sequence specific to each resource of the at least one resource as many of one or more predesignated load control processes as is necessary to eliminate the high load imposed on each resource of the at least one resource.

20. The method of claim 19, wherein a first resource of the at least one resource is a resource of a first application server of the N application servers, wherein said executing the predesignated sequence specific to the first resource comprises reducing an application program multiplicity of the first application server, and wherein said application program multiplicity on the first application server is defined as a maximum number of application programs to be executed concurrently on the first application server with respect to a plurality of transactions of the same type that were received by the first application server at the same time.

* * * * *